United States Patent

Israel

[15] 3,675,116
[45] July 4, 1972

[54] RESONANT CHARGING CIRCUIT

[72] Inventor: Henry M. Israel, 1/56, Worcester, Mass.
[73] Assignee: Raytheon Company, Lexington, Mass.
[22] Filed: March 15, 1971
[21] Appl. No.: 124,136

[52] U.S. Cl. ............................323/17, 307/246, 323/22 SC, 328/67
[51] Int. Cl. .........................................................G05f 1/56
[58] Field of Search ...................321/21; 307/106, 108, 246, 307/265, 252 J, 252 M; 323/22 SC, 17, DIG. 1; 325/141; 328/65, 67

[56] References Cited

UNITED STATES PATENTS

| | | | |
|---|---|---|---|
| 3,119,968 | 1/1964 | Schonberg | 328/67 |
| 3,333,120 | 7/1967 | Tomlin | 307/106 |
| 3,486,043 | 12/1969 | Johannessen | 307/265 |
| 3,139,585 | 6/1964 | Ross et al. | 328/67 X |
| 3,013,165 | 12/1961 | Bataille | 307/108 |
| 3,363,184 | 1/1968 | Smith | 328/67 X |

*Primary Examiner*—A. D. Pellinen
*Attorney*—Philip J. McFarland, Joseph D. Pannone and Richard M. Sharkansky

[57] ABSTRACT

A resonant charging choke and switching arrangement in a regulator for controlling the voltage across a capacitive storage element despite large variations in the voltage of a source of DC power for such element, the switching arrangement being operated through a control circuit: (a) electrically to disconnect the resonant charging choke from the capacitive storage element; and, (b) electrically to connect the resonant charging choke, through a low impedance circuit to the source of DC power when the voltage across the capacitive storage element reaches a predetermined level.

1 Claim, 2 Drawing Figures

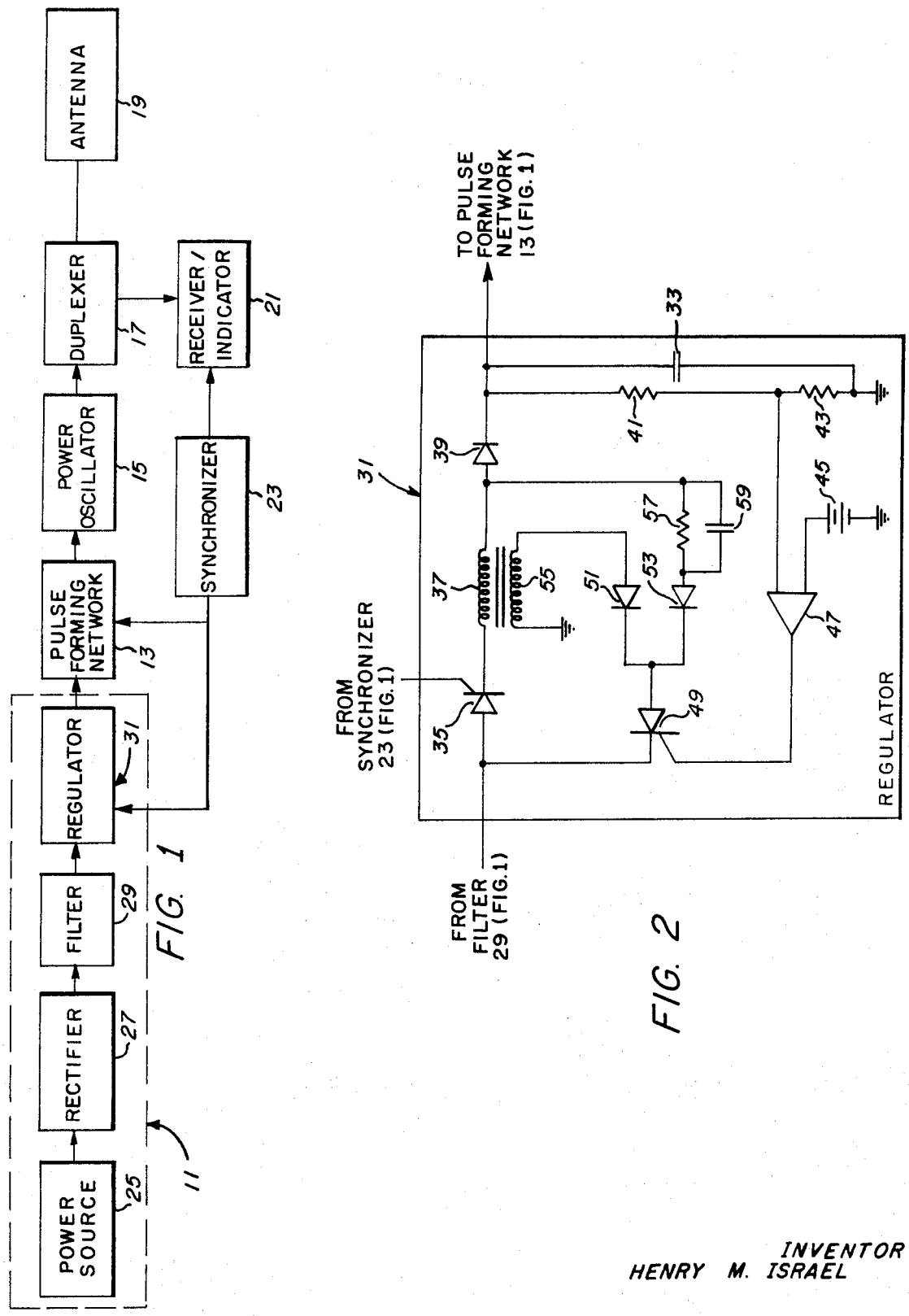

RESONANT CHARGING CIRCUIT

BACKGROUND OF THE INVENTION

This invention pertains generally to direct current power supplies and particularly to regulated power supplies of such type.

It is known in the art that any capacitive storage element, as a pulse forming network in a radar system, may be periodically charged from a direct current source through a resonant charging choke and switching arrangement. In applications in which size, weight and efficiency are not limiting factors, any one of many well known arrangements of such nature operate satisfactorily. That is, if size, weight and efficiency of the regulator is not a limiting factor in, say, a radar system, the capacitive storage element in such a system, as the pulse forming network, may be charged to a precise level at the end of each charge cycle of operation by any one of many known regulators.

Unfortunately, however, the size, weight and efficiency of any given regulator is often of paramount concern in practical radar systems. For example, the regulator and switching arrangement in a ground-controlled approach (GCA) radar for tactical use by the military must be small, light and efficient to make relocation of such a radar as easy as possible.

A regulator using the resonant charging process is generally provided with: (a) a switching arrangement between the charging choke of the regulator and the capacitive storage element to be charged; and, (b) means for discharging the remanent energy in the charging choke after the capacitive storage element has been charged. According to the art, a diode may be placed in circuit between the charging choke and the capacitive storage element to operate as a switch. An auxiliary winding on the charging choke may then be arranged to discharge the remanent energy therefrom and to create a voltage to back bias the diode when charging of the capacitive storage element is completed. It has been found, however, tat practical regulators so constructed do not reduce input variation by more than 10:1.

SUMMARY OF THE INVENTION

Therefore, it is a primary object of this invention to provide a power supply incorporating an improved regulator and charging circuit for a capacitive storage element, as a line modulator for a power oscillator in a GCA radar, such power supply being adapted periodically to recharge such storage element to a precise level.

Another object of this invention is to provide an improved regulator and charging circuit operating as hereinbefore stated, such circuitry being light in weight, small in size and high in efficiency when compared to known regulators.

Still another object of this invention is to provide an improved regulator and charging circuit arranged in such a manner that when a capacitive storage element is resonantly charged by such regulator and charging circuit to a predetermined level, a switching arrangement is automatically actuated to disconnect the capacitive storage element from the regulator and charging circuit and the energy then stored in such circuit is quickly removed therefrom.

These and other objects of this invention are attained generally by providing, in an improved resonant charging choke circuit for a capacitive storage element, a charging choke having a main winding and an auxiliary winding, the main winding being connected in circuit, through appropriate switching arrangements, with a DC power supply and the capacitive storage element to permit resonant charging of such storage element to a predetermined level and the auxiliary winding being connected in circuit, through appropriate control circuits, with the DC power supply to return the remanent energy in the charging choke to the DC power supply as soon as the energy delivered to the capacitive storage element reaches the predetermined level.

BRIEF DESCRIPTION OF THE DRAWINGS

For a more complete understanding of this invention reference is now made to the following description of a preferred embodiment of this invention as illustrated in the drawing, wherein:

FIG. 1 is a block diagram, greatly simplified, of a radar system incorporating the contemplated power supply; and, FIG. 2 is a schematic drawing showing one embodiment of the improved regulator portion of the power supply of FIG. 1.

DESCRIPTION OF THE PREFERRED EMBODIMENTS

Referring now to FIG. 1, it may be seen that a pulse radar system incorporating this invention includes a power supply 11, a pulse forming network 13, a power oscillator 15, a duplexer 17, an antenna 19, a receiver/indicator 21 and a synchronizer 23. Except as shown in detail in FIG. 2, the various elements of the illustrated system are conventional. Thus, the power supply 11 may consist of a power source 25 (say, a three phase AC generator having an output which may vary within wide limits), a rectifier 27 and a filter 29 ultimately to produce DC power at the input of a regulator 31 (to be described hereinafter). The regulator 31, in turn, resonantly charges to step up the voltage level of the DC power to a predetermined level required for charging of the pulse forming network 13. The latter, for example, may be a so-called soft tube modulator wherein a pulse forming network is charged and discharged through a pulse transformer (not shown) to the power oscillator 15. With a known arrangement of such a type, or any other known modulator, the voltage level of the DC power at the output of the regulator 31 may be stepped up to the level required to operate the power oscillator 15. The latter, for example, may be a magnetron. It has long been appreciated that frequency stability and constancy of the radio frequency power output of a magnetron requires that the voltage and current of the output of the pulse forming network be kept substantially the same from pulse to pulse. In order to maintain the voltage and current out of a pulse forming network at constant values it is, of course, necessary correspondingly to maintain the output of the regulator. It has also long been known that it is highly desirable to have the regulator operate without being affected appreciably by changes in the pulse repetition frequency of the system.

Referring now to FIG. 2, it may be seen that the regulator 31 shown therein, which meets the just-mentioned requirements, includes a silicon controlled rectifier (SCR 35), a charging choke (not numbered) having a main winding 37 disposed to charge resonantly when a voltage is applied thereto and an isolating diode 39. A conventional voltage divider (not numbered) but made up of resistors 41, 43 is connected between the isolating diode 39 and ground as shown. For convenience, a capacitive storage element, as capacitor 33, is also shown connected in parallel with such voltage divider although it will be recognized that such an element in practice would be located in the pulse forming network 13 of FIG. 1. It is evident that at the instant SCR 35 is caused to conduct, as shown here, when a signal from the synchronizer 23 (FIG. 1) is applied to its control electrode, the voltage across the capacitor 33 (which is then zero) will cause the isolating diode 39 to be biased into its conducting state Therefore, the inductive charging of the main winding 37 will, in turn, cause current to flow through the isolating diode 39 into the capacitor 33 to charge the latter toward a voltage twice that of the output of the filter 29 (FIG. 1). When capacitor 33 is charged to its desired voltage level (less than twice the filter output voltage), isolating diode 39 ceases to conduct for reasons to be set forth hereinafter.

The level of the voltage across the capacitor 33 is measured at all times by sensing the voltage at a tap (not numbered) in the conventional voltage divider made up of resistors 41, 43. When the voltage at the tap becomes equal to a reference voltage from a source 45, i.e., when the capacitor 33 is charged to the level desired, a differential amplifier 47 is caused to produce a control signal on the control electrode of a silicon controlled rectifier (SCR 49) to turn such element "on." The anode and cathode electrodes of SCR 49 are connected as shown to the input line (not numbered) of the regulator 31 and to diodes 51, 53. The former diode is connected to an auxiliary winding 55 on the charging choke, as is conventional, and the latter is connected, via a resistor 57 and a capacitor 59, to the main winding 37.

In passing, it will be noted that the turns ratio between the main winding 37 and the auxiliary winding 55 may be varied within wide limits. The particular turns ratio used depends, as is known, on the desired range of regulation for any application.

It will be observed that when SCR 49 is caused to conduct as just described, diodes 51, 53 are then biased to conduct, thereby completing an electrical circuit between each winding of the choke (not numbered), the isolating diode 39 and the filter 29 (FIG. 1). It follows, then, that isolating diode 39 is forced, almost instantaneously, into its nonconducting state to disconnect, electrically, the capacitor 33 from the main winding 37. At the same time diode 53 and diode 51 complete an electrical path (through SCR 49) back to the filter 29 (FIG. 1) to provide a discharge path for the energy remaining in the charging choke. When the voltage across diodes 51, 53 drops below their contact voltages, diodes 51, 53 become nonconducting, thereby causing SCR 35 and SCR 49 to shut off. The regulator 31 is then in condition to operate again.

It will be observed that the leakage inductance of the charging choke has no effect on the operation of the just-described regulator. That is, the operation of the isolating diode 39 when the capacitor 33 is charged to its desire level is controlled by SCR 49 and a suitable network, here comprising diode 53, resistor 57 and capacitor 59. It will also be observed that the degree of regulation obtained by use of the just-described regulator is dependent on the speed at which SCR 49 may be caused to conduct after a control signal is generated by the differential amplifier 47. Still further, it will be noted that, because the remanent energy in the charging choke is returned to the filter 29 (FIG. 1) through a low impedance path (except for a relatively small amount dissipated by resistor 57) the efficiency and bandwidth of the disclosed regulator are high. With a high efficiency, smaller and lighter components become feasible and with a wide bandwidth, and resulting short switching time, operation with a changing pulse repetition frequency is possible.

Having described one embodiment of this invention, it will be evident to one of skill in the art that modifications may be made without departing from any inventive concepts. Thus, it is obvious that either SCR 35 or SCR 49 may be replaced with switching tubes, as hydrogen thyratrons. Further, it is obvious that the control signal for SCR 35 may be passed through logic circuitry, including sensing means similar to that shown for SCR 49, so that operation of SCR 35 may be inhibited when the output voltage of the filter 29 (FIG. 1) is outside broad limits. Still further, will be obvious that the circuit elements to back bias the isolating diode 39 may be changed so long as any replacement elements provide a path to apply a back bias to the isolating diode 39 as soon as the capacitor 33 is charged to its desired level. It is felt, therefore, that this invention should not be restricted to its disclosed embodiment but rather should be limited only by the spirit and scope of the appended claims.

What is claimed is:

1. In an electric power supply utilizing a main winding of a resonant charging choke and an isolating diode periodically to supply electric power from a DC power supply to a capacitive storage element, such main winding being electrically disconnected from such storage element by operation of such isolating diode when the level of the voltage across such storage element equals a predetermined level, the improvement comprising:
  a. an auxiliary winding coupled to the main winding of the resonant charging choke, one end of such auxiliary winding being grounded;
  b. a first normally nonconductive diode in circuit with the second end of the auxiliary winding;
  c. a second normally nonconductive diode in circuit with the junction between the main winding of the resonant charging choke and the isolating diode; and,
  d. switching means, in circuit with the first normally nonconductive diode and the second normally non-conductive diode, such switching means bring operative when the voltage across the capacitive storage element reaches its predetermined level to cause the first and the second normally non-conductive diodes then to conduct.

* * * * *